United States Patent Office 3,726,699
Patented Apr. 10, 1973

3,726,699
BURNED BASIC REFRACTORY AND BATCH THEREFOR
Michael A. Nelson, Jeffersonville, Ind., Robert F. Patrick, Louisville, Ky., and Thomas M. Wehrenberg, Jeffersonville, Ind., assignors to Corhart Refractories Company, Louisville, Ky.
No Drawing. Filed Mar. 3, 1971, Ser. No. 120,722
Int. Cl. C04b 35/112
U.S. Cl. 106—59     13 Claims

ABSTRACT OF THE DISCLOSURE

Compacted and burned refractory body made from size-graded particulate batch mixture of chemical grade (Transvaal) chromite grain with low-silica content, dead-burned magnesite grain, and fused magnesia-chemical grade chromite grain containing 40–58% MgO. Chromite grain forms 10–35% of batch as −10 +150 mesh particles. Other two grains form three particle fractions: 25–60% of batch being coarse −4 +20 mesh composed of (as percent of batch) 5 to less than 20% fused grain and more than 5 to 40% magnesite grain, 0–30% of batch being intermediate −10 +35 mesh and 15–60% of batch being fine −35 mesh, of which fine magnesite grain is at least 10% of batch. The total +28 mesh particles of chromite grain and magnesite grain constitute 4 to less than 50% of batch. Body burned at 1660° C. or higher characterized by modulus of rupture at 1340° C. consistently above 1700 p.s.i. and as high as 2000 p.s.i. or higher.

BACKGROUND OF THE INVENTION

In a continuing search for better refractories to form linings and structure in furnaces employed for the modern methods of making steel and copper, and to withstand the harsher environments thereof, efforts have been directed to obtaining burned basic refractory that is ideally characterized by the combined attributes of the greatest direct bonding between the refractory crystal masses (i.e. minimal silicate or other lower melting phase as a bond between the refractory crystal masses) and highest high temperature strength together with the highest resistance to thermal shock or stress cracking as governed by lower modulus of elasticity. Recent prior developments in the direction of this ideal have required a batch containing a minimum of no less than 20% fused grain (viz in the coarse fraction) made from mixtures comprising magnesia and chrome ore. These developments are disclosed in U.S. Pats. 3,210,206 and 3,262,797, and in our copending U.S. patent application Ser. No. 818,095 filed Apr. 21, 1969, now Pat. No. 3,589,919.

Despite the technical advantages of these recently developed refractories, our experience indicates that the amount of them which can be produced for commercially acceptable prices is limited by two significant factors. First, suitably economical fused grain cannot be reasonably made by present technology other than the screening of crushed scrap fused material or cullet produced in the commercial manufacture of fusion-cast refractories having the same composition as required in the grain. Second, the volume and efficiency of, and the need for cullet to be recycled in, the fusion casting operation determines the amount of cullet available for fused grain.

Recent experience in the manufacture and sale of burned refractories made in accordance with our aforementioned copending application has made it evident that the supply of appropriate cullet for the fused grain portions thereof is insufficient to enable production of enough such refractories to meet the growing demand therefor. Accordingly, we were faced with the need and the problem of finding another burned basic refractory, and a batch from which to make it, with at least comparable structural, chemical and thermally-related physical properties to those noted of refractory according to our aforementioned copending application, but without the substantial amount of coarse fused grain required in the latter refractory.

SUMMARY OF THE INVENTION

We have now discovered a new burned refractory, and a batch from which to make it, that avoids the need for large amounts of magnesia-chrome fused grain and yet exhibits properties comparable to those of the refractory disclosed in our noted copending application, especially the high hot strength (again because of extensive direct bonding between refractory crystal masses) in combination with excellent thermal shock and spall resistance. Such new refractory, when burned at 1660° C. or higher (desirably at least 1675° C.), is characterized by a modulus of rupture at 1340° C. consistently above 1700 p.s.i. and as high as 2000 p.s.i. or higher.

This new development has come about not merely by discarding the noted previous requirement in the art of at least 20% coarse fused grain, but by discovering a certain essential combination of changes in the earlier coarse fraction. Thus, we have found it possible to obtain the comparable properties when making the fused grain of the coarse fraction only at least 5 to less than 20% of the entire refractory batch provided the coarse fraction includes an essential minimum amount of dead-burned magnesite grain exceeding 5% of the total refractory batch.

Accordingly, the present invention is a size-graded particulate batch, and a compacted and burned refractory body composed essentially thereof, that consists essentially of (1) A mixture of chemical grade chromite grain containing less than 4% $SiO_2$, dead-burned magnesite or magnesia grain, and fused grain composed essentially of a melted and resolidified mixture of chemical grade chromite and dead-burned magnesite or magnesia, which fused grain analyzes 40–58% (desirably 53–58%) MgO on an oxide basis, (2) 10–35% (preferably at least 25%) being a chromite fraction whose particles are substantially all −10 +150 mesh and composed of the chromite grain, (3) 25–60% (preferably 30–45%) being a coarse fraction whose particles are substantially all −4 +20 mesh and composed of, with percentages based on whole batch, 5 to less than 20% the fused grain and more than 5 to 40% the magnesite grain, (4) 0–30% (preferably 5–15%) being an intermediate fraction whose particles are substantially all −10 +35 mesh and composed of the fused grain and/or the magnesite grain, (5) 15–60% (preferably 25–35%) being a fine fraction whose particles are −35 mesh and composed of, based on whole batch, 10–40% magnesite grain and 0–50% fused grain, and (6) 4 (preferably 15) to less than 50% being +28 mesh particles of chromite grain and/or magnesite grain.

The more usual chemical grade chromite is Transvaal chromite, which is preferred. A typical range of analysis of such chromite is: 44.7–46.0% $Cr_2O_3$, 19.7–25.6% $FeO+Fe_2O_3$, 14.2–15.3% $Al_2O_3$, 10.0–11.4% MgO, 0.2–0.4% CaO and 0.7–3.8% $SiO_2$.

Any relatively high purity dead-burned or highly calcined magnesite or magnesia can be used. ("Magnesite and "magnesia" are used synonymously herein as is common in the industry.) A typical range of analysis of one suitable dead-burned magnesite is: 94.0–96.5% MgO, 0.8–

1.3% CaO, 1.3–2.4% $SiO_2$, 0.3–0.6% $Al_2O_3$, 0.3–0.8% FeO and trace of $Cr_2O_3$.

A typical range of analysis of one fused grain, obtained by crushing electrically melted, fusion-cast blocks, according to this invention is: 53–58% MgO, 17–22% $Cr_2O_3$, 5–10% $Al_2O_3$, up to 14% FeO, up to 3% $SiO_2$, up to 1% CaO, up to 1% fluorine and up to 2% $TiO_2$.

While the magnesite grain of the coarse fraction can be generally of the same −4 +20 mesh sizing as the fused grain of that same fraction, there has been observed in that case some tendency for such coarse magnesite grains in the burned refractory to be prematurely "plucked out" in service during corrosion and erosion. We have further discovered that this problem can be suppressed by sizing the particles of coarse magnesite grain substantially all −6 +20 mesh. This results in a burned body with reduced void volume encircling the coarse magnesite grain and increased amount of direct bonding to that grain.

In an especially beneficial form, the batch fractions are more particularly characterized as follows:

(a) The chromite fraction is 0–45% +28 mesh particles and 60–95% +65 mesh particles, (b) The fused grain of the coarse fraction is 73–89% +10 mesh particles, (c) The magnesite grain of the coarse fraction is 69–85% +10 mesh particles, (d) The intermediate fraction is 70–86% +28 mesh particles, and (e) The fine fraction is 0–10% +65 mesh particles, 8–23% +150 mesh particles and 27–43% +325 mesh particles.

In preparing a batch for fabricating bricks or other bodies, the appropriately size-graded and proportioned grain constituents for each fraction are mixed together for about 5–10 minutes with tempering fluid, according to any suitable or conventional procedure. Preferably, the solids, except the fine fraction, are first dry mixed for a minute or so. For pressing bricks, the tempering fluid can include lubricant and binder, such as a 10–33.3% water solution of waxy polyethylene glycol in an amount up to about 3% of the batch solids and/or a 50% water solution of lignin sulfite in an amount of about 0.25–3% of the batch solids. If the compacted green body is to be burned in service, the tempering fluid can be common aqueous sodium silicate solution with about 0.25–5% glycerin or ethylene glycol added as humectant to prevent drying cracks and a small amount of a common wetting agent that will reduce the amount of silicate required. The moldable batch is then formed by the usual techniques of mechanical pressing, hand ramming and the like. For mechanical pressing of the more common furnace bricks ranging from 9″ straight brick to 18″ large brick, 400 to 800 tons press pressure is usual and adequate. After the green bodies are compacted to shape, they may be dried if desired to increase their green handling strength. Thereafter, they are burned at a temperature of at least 1660° C. and as high as about 1800° C. (but desirably 1675–1725° C.) for at least about six hours, whereupon a very high degree of direct bonding and the improved strength are effected in the burned products. They are also characterized by quite low apparent porosity (about 15% or less) and good thermal shock resistance (as indicated by relatively low modulus of elasticity).

DESCRIPTION OF THE PREFERRED EMBODIMENTS

Example 1.—A variety of commercial furnace size bricks were mechanically pressed from a tempered batch made from the following constituents:

|   | Percent |
|---|---|
| Chromite fraction: Transvaal chromite grain | 32 |
| Coarse fraction: | |
|   Fused grain | 10 |
|   Dead-burned magnesite | 25 |
| Intermediate fraction: | |
|   Fused grain | 5 |
|   Dead-burned magnesite | 3 |
| Fine fraction: | |
|   Fused grain | 5 |
|   Dead-burned magnesite | 20 |

Each of these fractions of grain particles was size-graded so as to have the following cumulative percentages (maximum, minimum, and typical) of the whole fraction left on each of the several mesh size screens:

| Mesh | Maximum | Minimum | Typical |
|---|---|---|---|
| (a) Chromite fraction | | | |
| 10 | 0 | 0 | 0 |
| 28 | 45 | 0 | 15 |
| 35 | 70 | 20 | 35 |
| 48 | 85 | 40 | 53 |
| 65 | 95 | 60 | 78 |
| 150 | 100 | 80 | 96 |
| (b) Fused grain of the coarse fraction | | | |
| 4 | 0 | 0 | 0 |
| 6 | 21 | 1 | 10 |
| 8 | 57 | 39 | 48 |
| 10 | 89 | 73 | 78 |
| 12 | 100 | 85 | 92 |
| 20 | 100 | 94 | 97 |
| (c) Magnesite of the coarse fraction | | | |
| 6 | 0 | 0 | 0 |
| 8 | 40 | 24 | 32 |
| 10 | 85 | 69 | 77 |
| 12 | 97 | 87 | 92 |
| 20 | 100 | 95 | 97 |
| (d) Intermediate fraction | | | |
| 10 | 0 | 0 | 0 |
| 14 | 21 | 3 | 9 |
| 20 | 61 | 43 | 52 |
| 28 | 86 | 70 | 78 |
| 35 | 100 | 85 | 92 |
| (e) Fine fraction | | | |
| 35 | 0 | 0 | 0 |
| 65 | 10 | 0 | 5 |
| 100 | 15 | 0 | 8 |
| 150 | 23 | 8 | 15 |
| 200 | 30 | 15 | 22 |
| 250 | 33 | 18 | 26 |
| 325 | 43 | 27 | 35 |

Typical analyses of the three materials from which these constituents were formed are as follows:

Transvaal chromite—46.0% $Cr_2O_3$, 24.9% 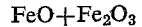

$FeO+Fe_2O_3$ 15.2% $Al_2O_3$, 11.3% MgO, 0.3% CaO, and 2.3% $SiO_2$,

Fused grain—55–56% MgO, 20% $Cr_2O_3$, 8% $Al_2O_3$, 11% FeO, 2.5% $SiO_2$, 0.5% CaO, 0.3% F, and 1.5% $TiO_2$, and Dead-burned magnesite—95.8% MgO, 1.0% CaO, 1.8% $SiO_2$, 0.4% $Al_2O_3$, 0.6% $Fe_2O_3$, and 0.05% $Cr_2O_3$.

After the pressed green bricks were dried, they were burned at about 1675° C. for at least nine hours, whereupon extensive direct bonding was developed between the refractory crystals of periclase and chrome spinel. Average modulus of rupture at 1340° C. of these bricks was about 1800 p.s.i. with a prevailing range of variation between 1700–2000 p.s.i. A series of 1″ x 1″ x 3″ thermal shock test pieces of these bricks underwent 20 cycles without any spalling failure in the severe test wherein one cycle involves placing a test piece at room temperature into a furnace preheated to 1400° C., holding the test piece in the furnace for 10 minutes, and then removing it from the furnace and placing it on a steel plate for 10 minutes in ambient atmosphere at room temperature.

Example 2.—Using the same size-grading and materials as in the preceding example, commercial furnace size bricks are mechanically pressed from a tempered batch formulated as follows:

| | Percent |
|---|---|
| Chromite fraction: Transvaal chromite grain | 32 |
| Coarse fraction: | |
| Fused grain | 10 |
| Dead-burned magnesite | 20 |
| Intermediate fraction: | |
| Fused grain | 5 |
| Dead-burned magnesite | 8 |
| Fine fraction: | |
| Fused grain | 5 |
| Dead-burned magnesite | 20 |

After being burned at about 1700° C., the highly direct bonded products will exhibit typical modulus of rupture of approximately 1750 p.s.i., at 1340° C. and withstand 20 cycles of the thermal shock test without spalling failure.

Example 3.—Again using the same size-graded and raw materials as in the preceding examples, bricks are mechanically pressed from a tempered batch of the following formulation:

| | Percent |
|---|---|
| Chromite fraction: Transvaal chromite grain | 32 |
| Coarse fraction: | |
| Fused grain | 10 |
| Dead-burned magnesite | 20 |
| Intermediate fraction: Dead-burned magnesite | 8 |
| Fine fraction: | |
| Dead-burned magnesite | 20 |
| Fused grain | 10 |

The direct bonded products resulting after burning at about 1700° C. will be found to have a typical modulus of rupture at 1340° C. of approximately 1750 p.s.i. and to withstand 20 cycles of the thermal shock test without spalling failure.

As noted previously, these batch formulations can also be employed as ramming mixes to form bodies that are burned in service.

In the foregoing specification, all mesh sizes are according to the Tyler series and all percentages are on a weight basis.

We claim:

1. A size-graded particulate batch for the production of refractory bodies consisting essentially of, with percentages on weight basis,
   a mixture of chemical grade chromite grain containing less than 4% SiO, dead-burned magnesite grain, and fused grain composed essentially of a melted and resolidified mixture of chemical grade chromite and dead-burned magnesite, said fused grain analyzing 40 to 58% MgO on an oxide basis,
   10 to 35% being a chromite fraction whose particles are substantially all −10 +150 mesh (Tyler) and composed of said chromite grain,
   25 to 60% being a coarse fraction whose particles are substantially all −4 +20 mesh (Tyler) and composed of, with percentages based on whole batch, 5 to less than 20% of said fused grain and more than 5 to 40% said magnesite grain,
   0 to 30% being an intermediate fraction whose particles are substantially all −10 +35 mesh (Tyler) and composed of at least one of said fused grain and said magnesite grain,
   15 to 60% being a fine fraction whose particles are −35 mesh (Tyler) and composed of, based on whole batch, 10 to 40% said magnesite grain and 0 to 50% said fused grain, and
   4 to less than 50% being +28 mesh (Tyler) particles of at least one of said chromite grain and said magnesite grain.

2. The batch of claim 1 wherein said chemical grade chromite is Transvaal chromite.

3. The batch of claim 1 wherein the particles of said magnesite grain of the coarse fraction are substantially all −6 +20 mesh (Tyler).

4. The batch of claim 3 wherein
   said chromite fraction is 0 to 45% +28 mesh (Tyler) particles and 60 to 95% +65 mesh (Tyler) particles,
   said fused grain of the coarse fraction is 73 to 89% +10 mesh (Tyler) particles,
   said magnesite grain of the coarse fraction is 69 to 85% +10 mesh (Tyler) particles,
   said intermediate fraction is 70 to 86% +28 mesh (Tyler) particles, and
   said fine fraction is 0 to 10% +65 mesh (Tyler) particles, 8 to 23% +150 mesh (Tyler) particles and 27 to 43% +325 mesh (Tyler) particles.

5. The batch of claim 4 wherein said chromite fraction constitutes at least 25% of said batch.

6. The batch of claim 4 wherein said +28 mesh (Tyler) particles constitute at least 15% of said batch.

7. The batch of claim 6 wherein
   said chemical grade chromite is Transvaal chromite,
   said chromite fraction constitutes at least 25% of said batch,
   said coarse fraction consitutes 30 to 45% of said batch,
   said intermediate fraction constitutes 5 to 15% of said batch, and
   said fine fraction constitutes 25 to 35% of said batch.

8. A compacted and burned refractory body composed essentially of the batch of claim 1.

9. The body of claim 8 which has been burned at a temperature of at least 1660° C.

10. A compacted and burned refractory body composed essentially of the batch of claim 4.

11. The body of claim 10 which has been burned at a temperature of at least 1660° C.

12. A compacted and burned refractory body composed essentially of the batch of claim 7.

13. The body of claim 12 which has been burned at a temperature of at least 1660° C. and is characterized by a modulus of rupture at 1340° C. of at least 1700 p.s.i.

References Cited

UNITED STATES PATENTS

| 3,210,206 | 10/1965 | Davies et al. | 106—59 |
| 3,262,797 | 7/1966 | Davies et al. | 106—59 |
| 3,589,919 | 6/1971 | Nelson et al. | 106—59 |

JAMES E. POER, Primary Examiner